United States Patent
Choi et al.

(10) Patent No.: US 6,400,662 B1
(45) Date of Patent: Jun. 4, 2002

(54) METHOD OF DETECTING TRACK CROSS SIGNAL OF OPTICAL DISC RECORDING/ REPRODUCING DEVICE AND APPARATUS THEREFOR

(75) Inventors: Byoung-ho Choi, Suwon; Jung-wan Ko, Yongin; Byung-in Ma, Suwon; Tae-yong Doh, Taegukwangyeok; Tae-yeon Lee, Seongnam; In-sik Park, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 36 days.

(21) Appl. No.: 09/660,469

(22) Filed: Sep. 12, 2000

(30) Foreign Application Priority Data

Sep. 14, 1999 (KR) .............................. 99-39331

(51) Int. Cl.[7] .................................. G11B 7/00
(52) U.S. Cl. .................. 369/44.28; 369/53.31
(58) Field of Search ........................ 369/44.25, 44.28, 369/44.29, 44.34, 44.35, 53.23, 47.36, 47.38, 47.4, 47.41, 47.46, 53.31, 53.33, 53.3, 124.15

(56) References Cited

U.S. PATENT DOCUMENTS 5,933,397 A * 8/1999 Yamashita et al. ....... 369/44.28

* cited by examiner

Primary Examiner—Paul W. Huber
(74) Attorney, Agent, or Firm—Staas & Halsey LLP

(57) ABSTRACT

An optical recording/reproducing apparatus for determining a direction in which an optical pick-up moves, and detecting a track cross signal. The track cross signal is useful as a basis of determining tracking pull-in after searching a track. In the present track cross signal detecting method, the track cross signal is obtained by binarizing the envelope of an RF signal RF0 obtained by subtracting some light receiving signals generated by some light receiving devices in the radial direction from other light receiving signals generated by other light receiving devices in the radial direction. The light receiving signals originate from a photodetector, divided into two or more sections in the radial direction. The track cross signal detecting method is especially useful for generating the track cross signal when the track pitch is smaller than the size of an optical spot, the signal being less affected by crosstalk caused by an adjacent track.

25 Claims, 9 Drawing Sheets

(Tp=0.74μm)

(Tp=0.46μm)

(Tp=0.37μm)

FIG. 2A
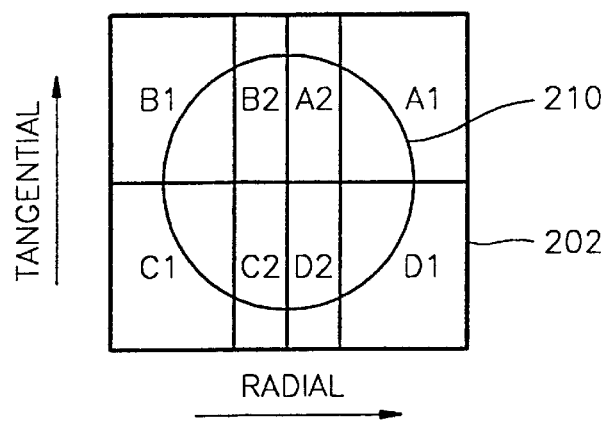
FIG. 2B
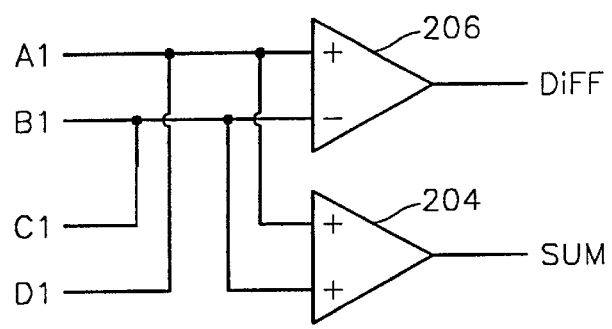
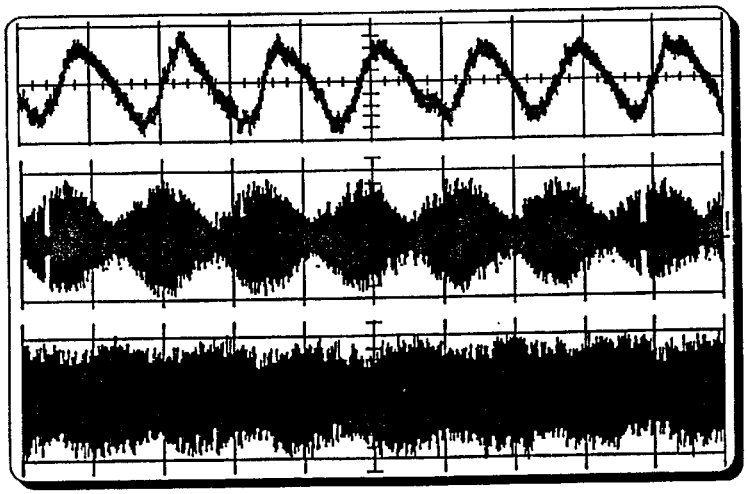
FIG. 3A
TRACK ERROR SIGNAL
FIG. 3B
(A1+D1)−(B1+C1)
FIG. 3C
(A1+D1)+(B1+C1)
($T_p$=0.37 μm)

METHOD OF DETECTING TRACK CROSS SIGNAL OF OPTICAL DISC RECORDING/ REPRODUCING DEVICE AND APPARATUS THEREFOR

CROSS REFERENCE TO RELATED APPLICATIONS

This application claims the benefit of Korean Application No. 99-39331, filed Sep. 14, 1999, in the Korean Patent Office, the disclosure of which is incorporated herein by reference.

BACKGROUND OF THE INVENTION

1. Field of the Invention

The present invention relates to an optical recording/ reproducing apparatus, and more particularly, to a method of determining a direction in which an optical pick-up moves, and detecting a track cross signal used as a basis of determining tracking pull-in after searching a track.

2. Description of the Related Art

Track searching of an optical recording/reproducing apparatus means searching for a target track by moving an optical pick-up in a radial direction of a disc. In track searching, the number of moved tracks must be counted in order to determine whether the optical pick-up arrived at the target track. In order to count the number of moved tracks, a track cross signal is necessary. The track cross signal is a pulse generated when the optical pick-up transects a track. That is, it is possible to know the number of moved tracks by counting the pulses generated by the track cross signal. Also, it is necessary to compensate for the number of tracks moved by the eccentricity of a disc. That is, the number of tracks must be increased in a direction, where the influence of the eccentricity increases, but reduced in a direction, where the influence of the eccentricity is reduced. It is determined whether to increase or to reduce the number of tracks using the fact that the phase of a track error signal is inverse to the phase of a track cross signal. Also, the track cross signal is necessary to determine the point of time of the tracking pull-in, after the optical pick-up reaches the target track.

Since the track cross signal is necessary to determine the amount of movement of a track, compensation for the influence of the eccentricity, and the point of time of the tracking pull-in after searching the track, it is important to obtain a correct track cross signal.

In a conventional method, the track cross signal is detected by the envelope of a sum signal generated by a quarter photodetector. However, in a high density optical disc such as an HD-DVD, the width of a track with respect to the size of an optical spot is much smaller than in a conventional CD/DVD. Accordingly, crosstalk caused by an adjacent track is mixed with an RF signal. Therefore, it is not easy to detect the envelope of the sum signal.

FIGS. 1A through 1C show changes in a track error signal and an RF signal according to a track width. FIGS. 1A, 1B, and 1C show the track error signals and RF signals when the optical wavelength is 400 nm, the numerical aperture (NA) of an object lens is 0.6, and track pitches are 0.74 $\mu$m (in the case of a DVD), 0.46 $\mu$m, and 0.37 $\mu$m, respectively.

As shown in FIGS. 1A through 1C, it is difficult to detect the envelope of the RF signal as the track pitch becomes narrower with respect to a uniform optical spot. This is because crosstalk caused by an adjacent track increases due to a narrow track pitch.

Therefore, it is difficult to detect the track cross signal as the track pitch becomes narrower with respect to the optical spot. This means that it is not easy to detect a track in a high density optical disc.

SUMMARY OF THE INVENTION

To solve the above problems, it is an object of the present invention to provide an improved method of detecting a track cross signal for a disc having high density narrow tracks.

It is another object of the present invention to provide an apparatus for detecting a track cross signal, which is suitable for the above method.

Additional objects and advantages of the invention will be set forth in part in the description which follows, and, in part, will be obvious from the description, or may be learned by practice of the invention.

Accordingly, to achieve the first object, there is provided a method of detecting a track cross signal, in which a track cross signal is obtained by binarizing the envelope of an RF signal RF0 obtained by subtracting some light receiving signals generated by some light receiving devices in the radial direction from other light receiving signals generated by other light receiving devices in the radial direction, in a photodetector divided into two sections in the radial direction.

Here, a track cross signal detection signal can be obtained by a quarter photodetector divided in the radial and tangential direction of a disc, a quarter photodetector divided in the radial direction of a disc, or an octal photodetector divided in radial and tangential directions of a disc.

To achieve the second object, there is provided an apparatus for detecting a track cross signal, comprising a radial subtracter for obtaining an RF signal RF0 by subtracting some light receiving signals generated by some light receiving devices in the radial direction from other light receiving signals generated by other light receiving devices in the radial direction, in a photodetector divided into two in the radial direction and a track cross signal generator for obtaining a track cross signal by binarizing the envelope of the RF signal RF0 with the radial subtracter.

BRIEF DESCRIPTION OF THE DRAWINGS

The above objects and advantages of the present invention will become more apparent from the following detailed description of the preferred embodiments taken in conjunction with the accompanying drawings in which:

FIGS. 2A and 2B show the structure of an octal photodetector and the structure of an apparatus for adding light receiving signals generated by the octal photodetector to each other or subtracting some light receiving signals from the other light receiving signals, respectively;

FIGS. 3A, 3B and 3C show the waveforms of a track error signal, a signal generated by the subtracter shown in FIG. 2, and a signal generated by the adder shown in FIG. 2, respectively;

DESCRIPTION OF THE PREFERRED EMBODIMENTS

Figure 1A:
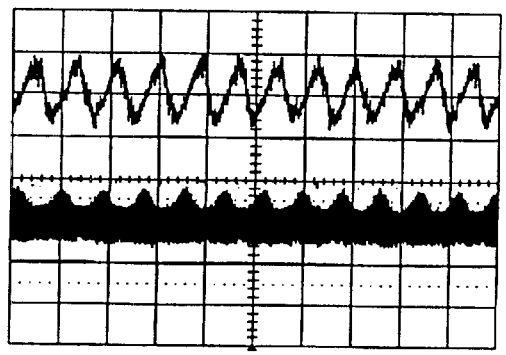
FIGS. 1A through 1C show changes in a track error signal and an RF signal according to a track width according to a conventional method.
Figure 1B:
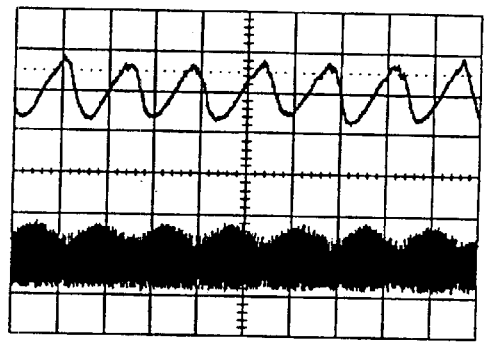
Figure 1C:
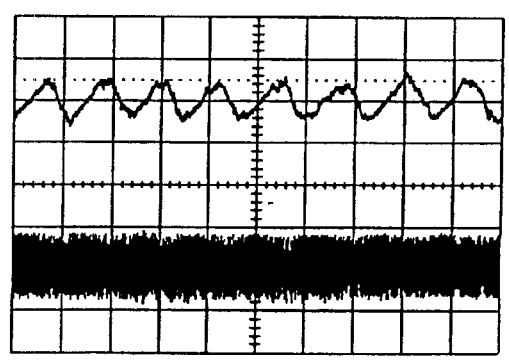

Reference will now be made in detail to the present preferred embodiments of the present invention, examples of which are illustrated in the accompanying drawings, wherein like reference numerals refer to like elements throughout.

FIG. 2A shows the structure of an octal photodetector 202. FIG. 2B shows the structure of an apparatus for adding light receiving signals generated by the octal photodetector to each other and subtracting some light receiving signals from the other light receiving signals FIG. 2B shows an adder 204 for adding light receiving signals generated by right outside light receiving devices A1 and D1 of the octal photodetector 202 to light receiving signals generated by left outside light receiving devices B1 and C1 of the octal photodetector 202 and a subtracter 206 for subtracting the light receiving signals generated by the left outside light receiving devices B1 and C1 of the octal photodetector 202 from the light receiving signals generated by the right outside light receiving devices A1 and D1 of the octal photodetector 202.

The octal photodetector 202 consists of eight light receiving devices A1, A2, B1, B2, C1, C2, D1, and D2, which are divided along radial and tangential directions of a disc. The inside light receiving devices A2, B2, C2, and D2 are divided to be smaller than the outside light receiving devices A1, B1, C1, and D1. Each respective light receiving device A1, A2, B1, B2, C1, C2, D1, and D2, generates a light receiving signal corresponding to the intensity of an optical spot 210 overlapping the light receiving surface.

The adder 204 sums the light receiving signals generated by the four outside light receiving devices A1, B1, C1, and D1 of octal photodetector 202 and provides the result as a sum signal SUM. The subtracter 206 subtracts the sum of the light receiving signals generated by the left outside two light receiving devices B1 and C1 of the octal photodetector 202 from the sum of the light receiving signals generated by the right outside two light receiving devices A1 and D1 of the octal photodetector 202 and provides the subtraction result as a difference signal DIFF.

FIGS. 3A through 3C show the waveforms of a track error signal (FIG. 3A), a signal (FIG. 3B) generated by the subtracter 206 shown in FIG. 2B, and a signal (FIG. 3C) generated by the adder 204 shown in FIG. 2B, when an optical wavelength is 400 nm, a numerical aperture (NA) of an object lens is 0.6, and a track pitch is 0.37 μm.

As shown in FIG. 3B, while the envelope of the signal generated by the subtracter 206 is clear, the envelope of the signal (FIG. 3C) generated by the adder 204 is unclear.

Therefore, in the method of detecting the track cross signal according to the present invention, the track cross signal is detected from the envelope of the RF signal generated by subtracting the signal generated from the right light receiving devices of the photodetector from the signal generated by the left light receiving device of the photodetector.

FIGS. 4A through 4F show waveforms for schematically illustrating the method of detecting the track cross signal according to the present invention. The waveforms shown in FIGS. 4A through 4F are generated by a disc, in which a track is formed so that a pit and a mirror alternate with each other in the radial direction of the disc. Another signal is generated by a disc, in which a track is formed so that a land and a groove alternate with each other.

The method of generating the track cross signal according to the present invention will now be described in detail with reference to FIGS. 4A through 4F.

Figure 4A:
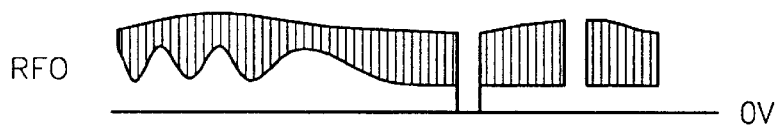
FIGS. 4A through 4F show waveforms for schematically illustrating a method of detecting a track cross signal according to the present invention.

1) The RF signal RF0 shown in FIG. 4A is obtained by subtracting the signal generated by the right light receiving devices of the photodetector from the signal generated by the left light receiving devices of the photodetector. In the signal shown in FIG. 4A, the upper envelope is the level of a mirror signal and the lower envelope is the levels of the pit and the mirror.

Change in the level of a mirror signal is caused by change in the reflection factor of a disc. The reflection factor of a disc partially changes according to positions on the disc. The level of the mirror signal changes, as shown in FIG. 4A, due to the change in reflection factor.

In the lower envelope, a trough corresponds to a track center, that is, the pit and a crest corresponds to a mirror. The reason why the crest does not coincide with the mirror level is that a signal level deteriorates due to crosstalk between adjacent tracks. In the case where a distance between the crests is short, the pit is positioned in an adjacent track on a locus along which the optical spot moves. In the case where the distance between the crests is long, the pit is not positioned on the adjacent track. The reason why the upper envelope overlaps the lower envelope in the RF signal is that the real locus of the optical spot does not transect the track at an angle of 90 degrees but transects the track at a very small angle. Although an optical pick-up moves in the radial direction of a disc, since the disc rotates during a search operation, a high frequency component determined by the pit formed in the track is generated. The high frequency component is the RF signal.

As shown in FIG. 4A, parts, from which the RF signal is omitted due to dust and scratch, exist.

Figure 4B:
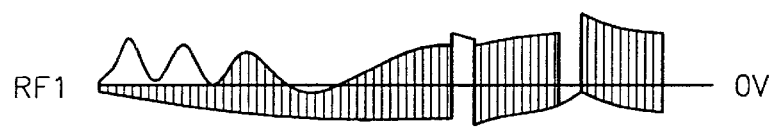

2) The signal RF1 shown in FIG. 4B is obtained by removing a direct current (DC) component by performing AC coupling using a capacitor in order to facilitate detection of envelopes.

Figure 4C:
Figure 4D:
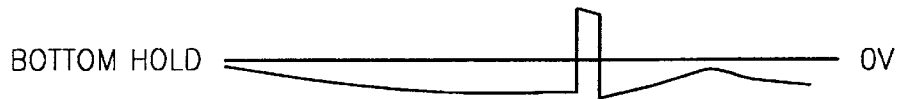

3) The peak signal and the bottom signal shown in FIGS. 4C and 4D are obtained by performing peak hold and bottom hold on the RF1 signal.

Figure 4E:
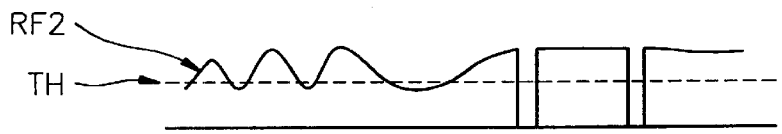

4) The difference signal RF2 shown in FIG. 4E is obtained by subtracting the bottom signal from the peak signal.

Figure 4F:
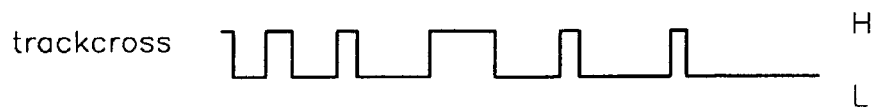

5) The track cross signal shown in FIG. 4F is obtained by binarizing the difference signal RF2 by a predetermined threshold value TH. Here, the threshold value TH is determined by the average of the peak hold signal shown in FIG. 4C and the bottom hold signal shown in FIG. 4D. The threshold value TH is described to be uniform in FIG. 4E. However, the threshold value TH changes due to changes in the level of the peak hold signal and the level of the bottom hold signal.

When the track cross signal shown in FIG. 4F is compared with the track cross signal shown in FIG. 4A, it is noted that the track cross signal shown in FIG. 4F is a pulse signal, which is at a low level in the trough of the lower envelope shown in FIG. 4A and is at a high level in the crest of the lower envelope shown in FIG. 4A. Therefore, it is possible to know the number of moved tracks by counting the number of pulses of the track cross signal shown in FIG. 4F.

Since the signal RF0 is obtained by subtracting the light receiving signal generated by the right light receiving devices in the radial direction of the photodetector from the light receiving signal generated by the left light receiving devices in the radial direction of the photodetector in the present invention, it is possible to obtain the track cross signal with a quarter photodetector divided in the radial and tangential directions of the disc, a quarter photodetector divided in the radial direction of the disc, or an octal photodetector divided in the radial and tangential directions of the disc, as described with reference to the apparatus for detecting the track cross signal according to the present invention shown in FIGS. 5 through 9.

Figure 5:
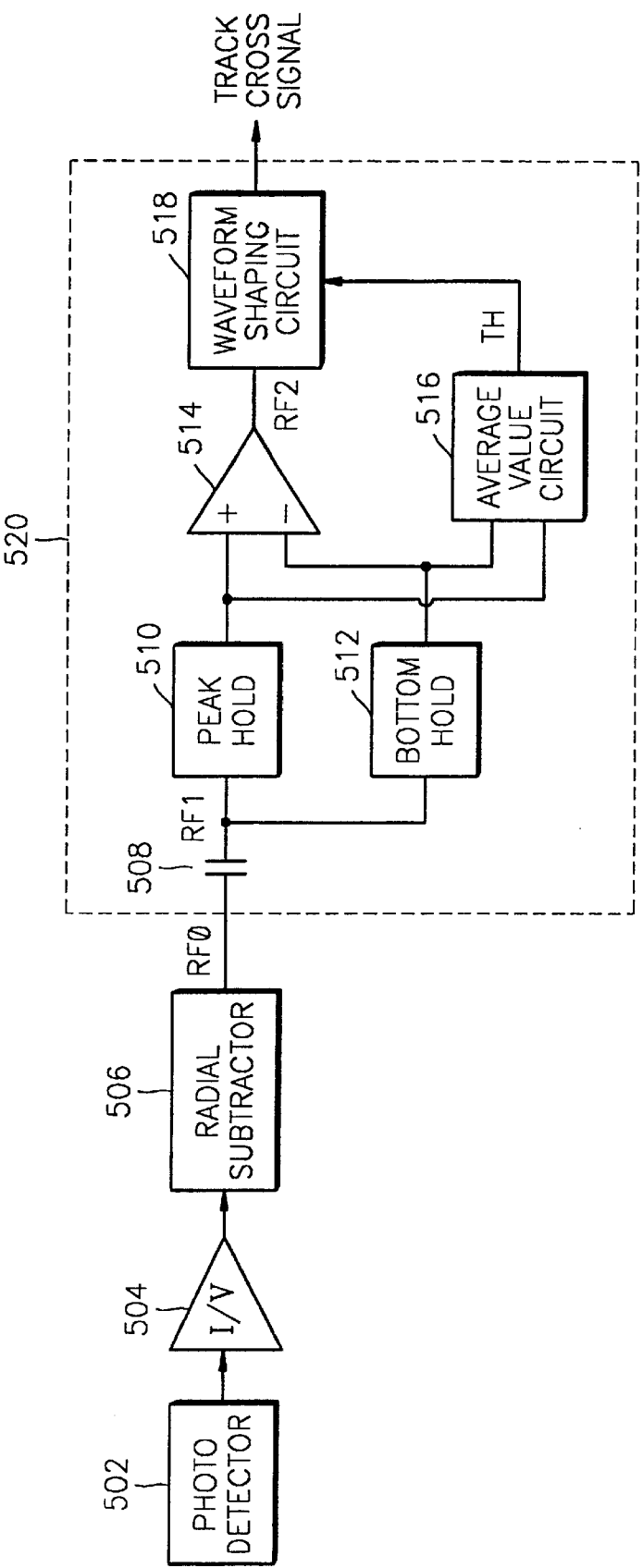
FIG. 5 is a block diagram showing the structure of an apparatus for detecting a track cross signal according to the present invention.

FIG. 5 is a block diagram showing the structure of the apparatus for detecting the track cross signal according to the present invention. The apparatus shown in FIG. 5 includes a photodetector 502, a current/voltage converter 504, a radial subtracter 506, and a track cross signal generator 520. The track cross signal generator 520 includes a capacitor 508, a peak hold circuit 510, a bottom hold circuit 512, a subtracter 514, an average value circuit 516, and a waveform shaping circuit 518.

The capacitor 508 performs AC coupling on the signal RF0 generated by the radial subtracter 506 and generates the signal RF1 shown in FIG. 4B.

The peak hold circuit 510 and the bottom hold circuit 512 hold the peak value and the bottom value, respectively, of the signal RF1 generated by the capacitor 508, and generate the peak hold signal and the bottom hold signal shown in FIGS. 4C and 4D.

The subtracter 514 subtracts the bottom hold signal generated by the bottom hold circuit 512 from the peak hold signal generated by the peak hold circuit 510 and obtains the difference signal RF2 shown in FIG. 4E.

The average value circuit 516 generates the threshold value TH for binarization by the average value of the peak hold signal generated by the peak hold circuit 510 and the bottom hold signal generated by the bottom hold circuit 512.

The waveform shaping circuit 518 binarizes the difference signal RF2 generated by the subtracter 514 by the threshold value TH generated by the average value circuit 516 and obtains the track cross signal shown in FIG. 4F.

Since the signal RF0 is obtained by subtracting the light receiving signal generated by the right light receiving device in the radial direction of the photodetector from the light receiving signal generated by the left light receiving device in the radial direction of the photodetector, in the apparatus for detecting the track cross signal according to the present invention, the signal RF0 can be obtained by the quarter photodetector divided in the radial and tangential directions of the disc, the quarter photodetector divided in the radial direction of the disc, or the octal photodetector divided in the radial and tangential directions of the disc. The structure of a radial adder changes according to the kind of photodetector. Various photodetectors and corresponding adders are described with reference to FIGS. 6A through 9C.

Figure 6A:
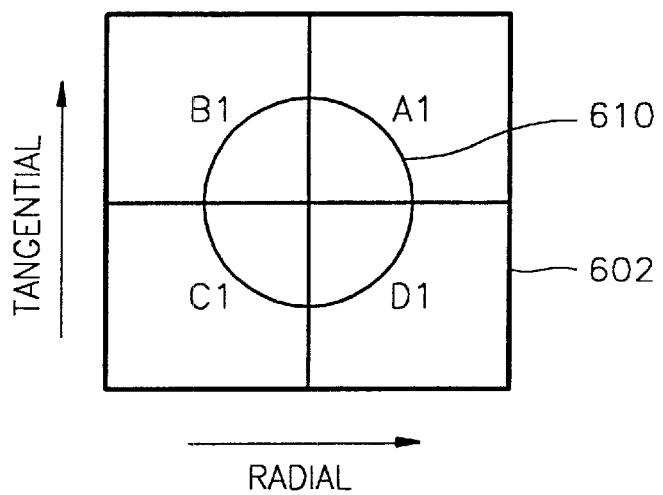
FIGS. 6A and 6B show the structure of an apparatus for obtaining an RF0 signal by a quarter photodetector according to the present invention.
Figure 6B:
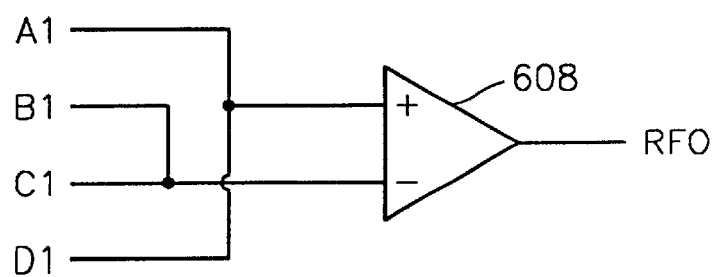

FIGS. 6A and 6B show the structure of an apparatus for obtaining the signal RF0 using a quarter photodetector. FIG. 6A shows a quarter photodetector 602. FIG. 6B shows the structure of a radial subtracter 608 for obtaining the signal RF0 using the light receiving signals generated by the quarter photodetector 602.

The radial subtracter 608 shown in FIG. 6B subtracts the sum of the light receiving signals generated by the light receiving devices B1 and C1, located on the left in the radial direction of the quarter photodetector 602, from the sum of the light receiving signals generated by the light receiving devices At and D1, located on the right in the radial direction of the quarter photodetector 602. Reference numeral 610 denotes an optical spot.

Figure 7A:
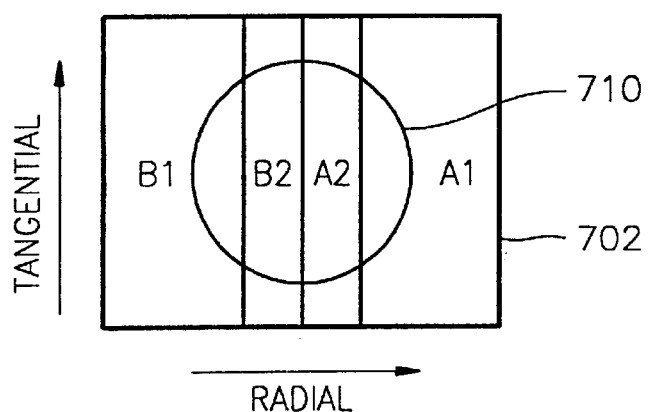
FIGS. 7A and 7B show the structure of an apparatus for obtaining the RF0 signal by another quarter photodetector according to the present invention.
Figure 7B:
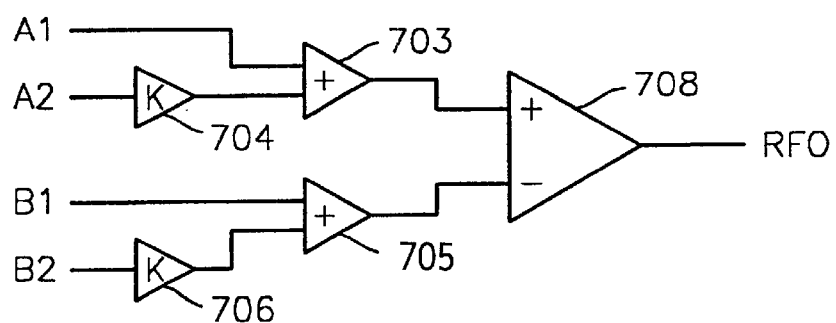

FIGS. 7A and 7B show the structure of an apparatus for obtaining the signal RF0 by another type of quarter photodetector. FIG. 7A shows a photodetector 702. FIG. 7B shows the structure of a radial subtracter 708 for obtaining the signal RF0 using the light receiving signals generated by the photodetector 702. The quarter photodetector 702 shown in FIG. 7A is divided into four sections in the radial direction so that inside light receiving devices are narrower than outside light receiving devices. It is possible to disperse the influence of crosstalk with the quarter light photodetector 702 since the inside light receiving devices can intensively detect the main lobe of the optical spot reflected from the disc and the outside light receiving devices can intensively detect the side lobe of the optical spot.

The radial subtracter 708 shown in FIG. 7B subtracts the sum of the light receiving signals generated by the light receiving devices B1 and B2, located on the left in the radial direction of the quarter photodetector 602, from the sum of the light receiving signals generated by the right light receiving devices A1 and A2, located on the right in the radial direction of the quarter photodetector 602. In taking the sum of the light receiving signals generated by the right light receiving devices A1 and A2 or the sum of the light receiving signals generated by the left light receiving devices B1 and B2 after multiplying the light receiving signals generated by the inside light receiving devices A2 and B2 by predetermined coefficients with amplifiers 704 and 706, the multiplication results are added together by adders 703 and 705. Here, the coefficient K of the light receiving signals generated by the inside light receiving devices is equal to 1, greater than 1 or smaller than 1. As an alternate to setting a coefficient of 1, amplifiers 704 and 706 may be removed and the light receiving signals generated by the light receiving devices A2 and B2 may be connected directly to the adders 703 and 705 respectively.

When the coefficient K is greater than 1, the light receiving signals generated by the inside light receiving devices A2 and B2 of the quarter photodetector 702 contribute more to the addition result. When the coefficient K is much smaller than 1, the light receiving signals generated by the outside light receiving devices A1 and B1 of the quarter photodetector 702 contribute more to the addition result.

Figure 8A:
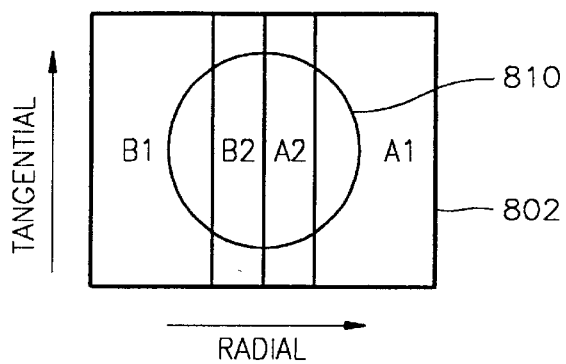
FIGS. 8A and 8B show another structure of the apparatus for obtaining the RF0 signal by the quarter photodetector shown in FIG. 7A according to the present invention.
Figure 8B:
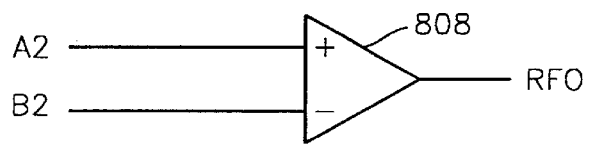

FIGS. 8A and 8B show another structure of the apparatus for obtaining the signal RF0 by the quarter photodetector shown in FIG. 7A. FIG. 8A shows a quarter photodetector 802. FIG. 8B shows the structure of a radial subtracter 808 for obtaining the signal RF0 using the light receiving signals generated by a quarter photodetector 802. The quarter photodetector 802 shown in FIG. 8A is the same as the quarter photodetector 702 shown in FIG. 7A.

The radial subtracter 808 shown in FIG. 8B subtracts the light receiving signal generated by the inside light receiving device B2 of the quarter photodetector 802, from the light receiving signal generated by the inside light receiving device A2 of the quarter photodetector 802.

The radial subtracter 808 shown in FIG. 8B generates the signal RF0, which is less affected by crosstalk, since the light receiving devices inside the quarter photodetector 802 strongly detect the main lobe of the optical spot reflected from the disc.

Figure 9A:
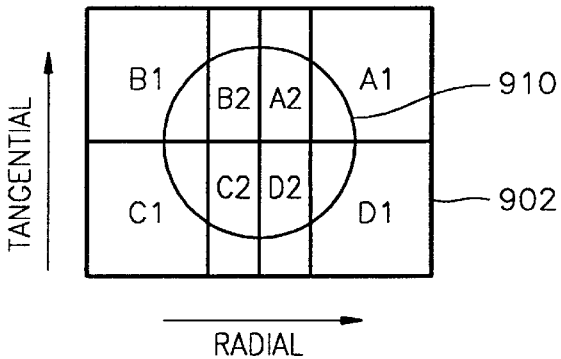
FIGS. 9A and 9B show the structure of an apparatus for obtaining the RF0 signal by an octal photodetector according to the present invention.
Figure 9B:
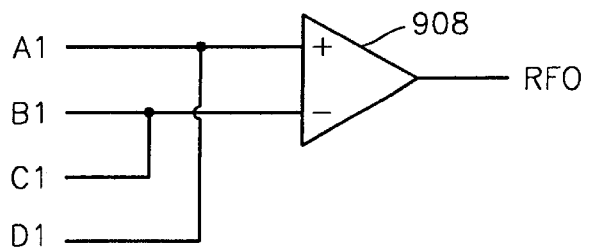

FIGS. 9A and 9B show the structure of the apparatus for obtaining the signal RF0 by an octal photodetector. FIG. 9A shows an octal photodetector 902. FIG. 9B shows the structure of a radial subtracter 908 for obtaining the signal RF0 using the light receiving signals generated by the octal photodetector 902. The octal photodetector 902 shown in FIG. 9A divides the photodetector into eight sections in the radial and tangential directions so that the inside light receiving devices, A2, B2, C2, D2, are narrower than the outside light receiving devices, A1, B1, C1, D1. It is possible to reduce the influence of crosstalk with the octal light receiving device 902 since the inside light receiving devices can strongly detect the main lobe of the optical spot reflected from the disc and the outside light receiving devices can strongly detect the side lobe of the optical spot reflected from the disc.

The radial subtracter 908 shown in FIG. 9B subtracts the sum of the light receiving signals generated by the light receiving devices B1 and C1, located on the left and the outside in the radial direction of the octal photodetector 902, from the sum of the light receiving signals generated by the light receiving devices A1 and D1 located on the right and the outside in the radial direction of the octal photodetector 902.

Figure 9C:
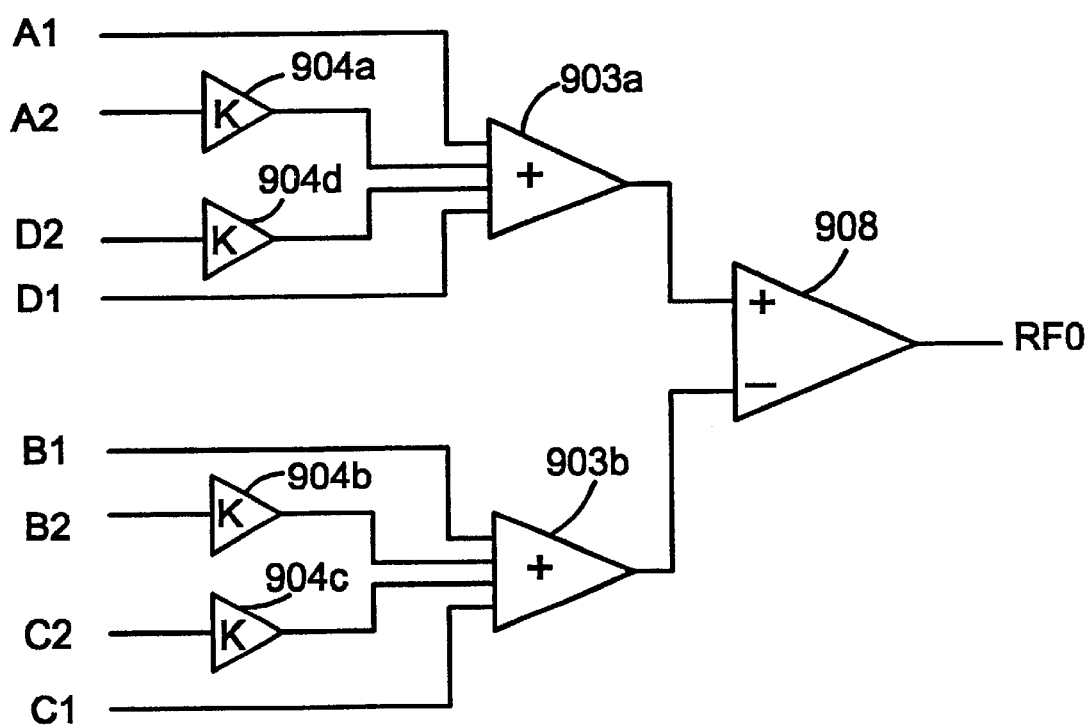
FIG. 9C shows an alternate construction of a subtractor for obtaining the RF0 signal using the octal photodetector shown in FIG. 9A.

An alternate embodiment of the apparatus shown in FIG. 9B is shown in FIG. 9C. In the embodiment shown in FIG. 9C, each left inside light receiving signal, B2, C2, is multiplied by a coefficient K at amplifiers 904b and 904c, respectively, and the multiplication results are added to left outside light receiving signals B1 and C1 by adder 903b. Similarly, each right inside light receiving signal, A2, D2, is multiplied by a coefficient K at amplifiers 904a and 904b, respectively, and the multiplication results are added to right outside light receiving signals A1 and D1 by adder 903a. Left added signal, (B1+C1+KC2+KB2) is subtracted from right added signal (A1+D1+KA2+KD2) at amplifier 908 to obtain the signal RF0.

When the coefficient K is much larger than 1, the light receiving signals generated by the inside light receiving devices A2, B2, C2 and D2 of the octal photodetector 902 contribute more to the addition result. When the coefficient is much smaller than 1, the light receiving signals generated by the outside light receiving devices A1, B1, C1 and D1 contribute more to the addition result.

Figure 10:
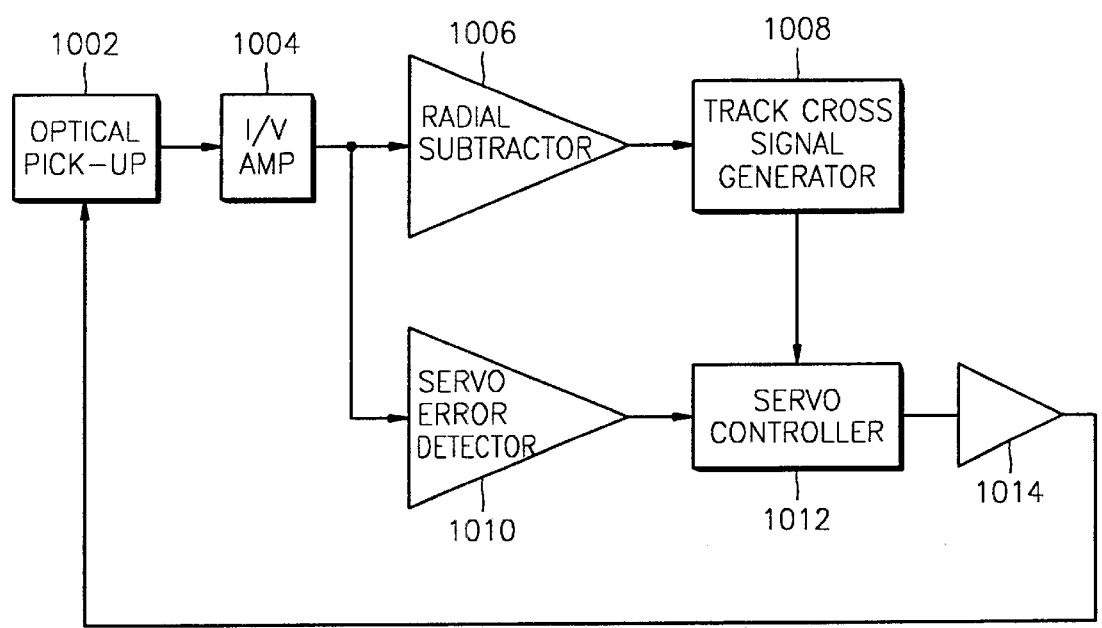
FIG. 10 is a block diagram showing the structure of a searching apparatus, to which the apparatus for detecting the track cross signal according to the present invention is applied.

FIG. 10 is a block diagram showing the structure of a search apparatus, to which the track cross signal detecting apparatus according to the present invention is applied. The apparatus shown in FIG. 10 includes an optical pick-up 1002, a current/voltage converter 1004, a radial subtracter 1006, a track cross signal generator 1008, a servo error detector 1010, a servo controller 1012, and an optical pick-up driver 1014.

Here, the track cross signal generator 1008 corresponds to the track cross signal generator 520 shown in FIG. 5, the optical pickup 1002 includes one of the photodetectors shown in FIGS. 6A, 7A, and 9A and the radial subtracter 1006 corresponds to an appropriate one of the radial subtracters shown in FIGS. 6B, 7B, 8B, 9B and 9C as identified above.

The servo controller 1012 transfers the optical pick-up 1002 to a target track using the track cross signal generated by the track cross signal generator 520 and the servo error signal generated by the servo error detector 1010, in performing a track search operation.

As mentioned above, in the track cross signal detecting method according to the present invention, the track cross signal is generated using an RF signal obtained by subtracting some light receiving signals generated by some light receiving devices divided into sections in the radial direction from other light receiving signals generated by other light receiving devices divided into sections in the radial direction, in the photodetector. When the track pitch is smaller than the size of the optical spot, it is possible to generate the track cross signal which is less affected by crosstalk caused by an adjacent track.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of detecting a track cross signal in a recording disc, comprising:
    subtracting at least one light receiving signal generated by a light receiving device in a radial direction of the recording disc from at least one other light receiving signal generated by a respective other light receiving device in the radial direction to obtain an RF envelope signal RF0;
    binarizing the envelope of the RF signal RF0.

2. A method of detecting a track cross signal in a recording disc, the recording disc having a center and a perimeter, the method comprising:
    obtaining an RF signal RF0 by subtracting at least one light receiving signal generated by at least one light receiving device of a divided photodetector from at least one other light receiving signal generated by at least one other light receiving device of the photodetector, the photodetector divided into at least two sections in a radial direction of the recording disc;
    obtaining a signal RF1 by AC coupling the signal RF0;
    obtaining a peak hold signal and a bottom hold signal by holding a peak value and a bottom value, respectively, of the signal RF1;
    obtaining a difference signal RF2 by subtracting the bottom hold signal from the peak hold signal; and
    obtaining a binarized pulse signal by shaping a waveform of the difference signal RF2 by a predetermined threshold value TH and outputting the binarized pulse signal as the track cross signal.

3. The method of claim 2, wherein the threshold value TH is an average of the peak hold signal and the bottom hold signal.

4. The method of claim 2, wherein the photodetector is further divided, having light receiving devices A1, B1, C1, and D1 arrayed in radial and tangential directions of the recording disc and generating light receiving signals A1, B1, C1 and D1, respectively, the light receiving devices B1 and C1 located more toward the center of the recording disc than the light receiving devices A1 and D1, and wherein the obtaining of the RF signal RF0 comprises: subtracting a sum of the light receiving signals B1 and C1 from the sum of the light receiving signals A1 and D1 to obtain the signal RF0.

5. The method of claim 2, wherein the photodetector is further divided, having light receiving devices A1, A2, B1 and B2 arranged in a radial direction of the recording disc and generating light receiving signals A1, A2, B1 and B2, respectively, the light receiving devices B1 and B2 located more toward the center of the recording disc than the light receiving devices A1 and A2, and wherein the obtaining of the RF signal RF0 comprises:

subtracting the sum of the light receiving signals B1 and B2 from the sum of the light receiving signals A1 and A2 to obtain the signal RF0.

6. The method of claim 5, wherein light receiving devices B1 and A2 are located more toward the center of the recording disc than light receiving devices B2 and A1, respectively, and the method further comprises multiplying the light receiving signals A2 and B2 by a predetermined coefficient prior to summing the light receiving signals.

7. The method of claim 6, wherein the coefficient is greater than 1.

8. The method of claim 6, wherein the coefficient is smaller than 1.

9. The method of claim 2, wherein the photodetector is further divided, having light receiving devices A1, A2, B1, and B2 arranged in a radial direction of the recording disc and generating light receiving signals A1, A2, B1 and B2, respectively, the light receiving device B2 located more toward the center of the recording disc than the light receiving device A2, and wherein the obtaining of the RF signal RF0 comprises:

subtracting the light receiving signal B2 from the light receiving signal A2 to obtain the signal RF0.

10. The method of claim 2, wherein the photodetector is further divided having light receiving devices A1, A2, B1, B2, C1, C2, D1, and D2 arrayed in radial and tangential directions of the recording disc, the light receiving devices A1, A2, B1 and B2 arranged in one row of the array and the light receiving devices C1, C2, D1 and D2 arranged in another row of the array, the light receiving devices B1 and C1 located more toward the center of the recording disc than the light receiving devices A1 and C1, and the light receiving devices A1 and D1 located more toward the perimeter of the recording disc than any of the light receiving devices A2, B2, C2, and D2; and wherein the obtaining of the RF signal RF0 comprises:

subtracting the sum of light receiving signals generated by the light receiving devices B1 and C1 the sum of light receiving signals generated by the light receiving devices A1 and D1 to obtain the signal RF0.

11. An apparatus for detecting a track cross signal in light reflected from a recording disc, the recording disc having a center and an outer perimeter, the apparatus comprising:

a photodetector which receives the reflected light, the photodetector having at least two light receiving devices, one of the at least two light receiving devices arranged to receive light reflected from the optical disc at a first position and another of the at least two light receiving devices arranged to receive light reflected from a second position more radially outward from the center of the recording disc than the first position, each light receiving device generating a respective light receiving signal;

a radial subtracter which obtains an RF signal RF0 by subtracting at least one of the respective light receiving signals from another of the respective light receiving signals; and a track cross signal generator which binarizes an envelope of the RF signal RF0.

12. An apparatus for detecting a track cross signal in light reflected from a recording disc, the recording disc having a center and an outer perimeter, the apparatus comprising:

a photodetector which receives the reflected light, the photodetector having at least two light receiving devices, each light receiving device generating a respective light receiving signal;

a radial subtracter which obtains an RF signal RF0 by subtracting at least one light receiving signal from another light receiving signal; and a track cross signal generator which binarizes an envelope of the RF signal RF0, wherein the track cross signal generator comprises:

a capacitor which couples the signal RF0 to provide a signal RF1, a peak hold circuit which generates a peak hold signal by holding a peak value of the signal RF1, a bottom hold circuit which generates a bottom hold signal by holding a bottom value of the signal RF1, a subtracter which subtracts the bottom hold signal from the peak hold signal to obtain a difference signal RF2, and a waveform shaping unit which binarizes the difference signal RF2 relative to a predetermined threshold value TH and outputs a binarized pulse signal as the track cross signal.

13. The apparatus of claim 12, further comprising an average value circuit which averages the peak hold signal and the bottom hold signal, and provides the average as the threshold value TH.

14. The apparatus of claim 12, wherein the photodetector is a quarter photodetector having light receiving devices A1, B1, C1, and D1 arrayed in radial and tangential directions of the recording disc, light receiving devices B1 and C1 located more toward the center of the recording disc than light receiving devices A1 and D1, and wherein the radial subtracter subtracts the sum of the light receiving signals generated by the light receiving devices B1 and C1 from the sum of the light receiving signals generated by the light receiving devices A1 and D1 to obtain the difference signal RF0.

15. The apparatus of claim 12, wherein the photodetector is a quarter photodetector having light receiving devices A1, A2, B1, and B2 arranged in the radial direction of the recording disc, light receiving devices B1 and B2 more toward the center of the recording disc than light receiving devices A1 and A2, and wherein the radial director subtracts the sum of the light receiving signals generated by the light receiving devices B1 and B2 from the sum of the light receiving signals generated by the light receiving devices A1 and A2 to obtain the difference signal RF0.

16. The apparatus of claim 15, wherein the light receiving devices A2 and B2 are positioned between the light receiving devices A1 and B1 and wherein the radial subtracter respectively multiplies the light receiving signals generated by the light receiving devices A2 and B2 by a predetermined coefficient prior to summing the light receiving signals generated by the light receiving devices A1 and B1 with the light receiving signals generated by the light receiving devices A2 and B2.

17. The apparatus of claim 16, wherein the coefficient is larger than 1.

18. The apparatus of claim 16, wherein the coefficient is smaller than 1.

19. The apparatus of claim 12, wherein the photodetector is a quarter photodetector having light receiving devices A1, A2, B1, and B2 arranged in a radial direction of recording disc, light receiving devices A2 and B2 positioned between light receiving devices A1 and B1 and light receiving device B1 positioned more toward the center of the recording disc than light receiving devices A1, A2 and B2, and wherein the radial subtracter subtracts the light receiving signal generated by the light receiving device B2 from the light receiving signal generated by the light receiving device A2.

20. The apparatus of claim 12, wherein the photodetector is an octal photodetector having light receiving devices A1, A2, B1, B2, C1, C2, D1, and D2 arrayed in radial and tangential directions of the recording disc, light receiving devices A2 and B2 positioned between light receiving devices A1 and B1, light receiving devices C2 and D2 positioned between light receiving devices C1 and D1, and light receiving devices B1, B2, C1 and C2 positioned more toward the center of the recording disc than light receiving devices A1 and D1, and the radial subtracter subtracts the sum of the light receiving signals generated by the light receiving devices B1 and C1 from the sum of the light receiving signals generated by the light receiving devices A1 and D1 to obtain the difference signal RF0.

21. The apparatus of claim 12, wherein
the photodetector is an octal photodetector having light receiving devices A1, A2, B1, B2, C1, C2, D1 and D2 which generate light receiving signals A1, A2, B1, B2, C1, C2, D1 and D2, respectively, the light receiving devices arrayed in radial and tangential directions of the recording disc, light receiving devices A2 and B2 positioned between light receiving devices A1 and B1, light receiving devices C2 and D2 positioned between light receiving devices C1 and D1, and light receiving devices B1, B2, C1 and C2 positioned more toward the center of the recording disc than light receiving devices A1 and D1; and
wherein the radial subtracter subtracts the sum of the light receiving signals B1, B2, C1 and C2 from the sum of light receiving signals A1, A2, D1 and D2.

22. The apparatus of claim 21, wherein light receiving signals A2 and D2 are multiplied by a predetermined coefficient prior to the summing of signals A1, A2, D1 and D2 and light receiving signals B2 and C2 are multiplied by the predetermined coefficient prior to the summing of signals B1, C1, B2 and C2.

23. A disc search apparatus to position an optical pickup on an optical recording disc, the apparatus comprising:
an optical pickup comprising a photodetector having at least two light receiving devices arranged in a radial direction of the recording disc, each light receiving device generating a respective light receiving signal in response to a reflected light;
a radial subtracter which subtracts at least one light receiving signal from at least one other light receiving signal to obtain an RF envelope signal;

a peak hold circuit which detects a peak value of the RF envelope signal to output a peak hold signal;
a bottom hold circuit which detects a bottom value of the envelope signal RF0 to output a bottom hold signal;
a subtracter which subtracts the bottom hold signal from the peak hold signal to output a difference signal;
a binarizer which compares the difference signal with a threshold value to output a binarized track cross signal; and
a servo controller which positions the optical pickup based on the binarized track cross signal.

24. A method of detecting a track cross signal in a recording disc, the recording disc having a center and a perimeter, the method comprising:
subtracting a first light receiving signal from a second light receiving signal, to obtain a first difference signal, the first and second light receiving signals corresponding to light reflected from respective different positions in a radial direction of the recording disc;
removing a DC component of the first difference signal;
holding a peak value and a bottom value of the DC component removed signal;
subtracting the peak hold value and the bottom hold value to obtain a second difference signal; and
binarizing the second difference signal relative to a predetermined threshold value.

25. An apparatus for detecting a track cross signal in a recording disc, the recording disc having a center and a perimeter, the apparatus comprising:
a photodetector which detects first and second light receiving signals corresponding to light reflected from respective different positions in a radial direction of the recording disc;
a first circuit which subtracts the first light receiving signal from the second light receiving signal, to obtain a first difference signal;
a second circuit which:
removes a DC component of the first difference signal, detects a peak hold signal and a bottom hold signal of the first difference signal after removal of the DC component, and
subtracts the bottom hold signal and the peak hold signal to obtain a second difference signal; and
a third circuit which compares the second difference signal with to a threshold value to output a binarized track cross signal.

* * * * *

UNITED STATES PATENT AND TRADEMARK OFFICE
CERTIFICATE OF CORRECTION

PATENT NO. : 6,400,662 B1
DATED : June 4, 2002
INVENTOR(S) : Byoung-ho Choi et al.

It is certified that error appears in the above-identified patent and that said Letters Patent is hereby corrected as shown below:

Column 8,
Line 62, "subtracting" begins a new paragraph.

Column 11,
Line 19, insert -- : -- after "wherein".

Signed and Sealed this

Fifteenth Day of October, 2002

Attest:

JAMES E. ROGAN
Attesting Officer     Director of the United States Patent and Trademark Office